Oct. 25, 1938.   R. G. BIRR   2,134,631
TOWELING DISPENSING APPARATUS
Filed May 18, 1936   3 Sheets-Sheet 1

INVENTOR
RUDOLPH G. BIRR
BY
ATTORNEYS

Oct. 25, 1938.  R. G. BIRR  2,134,631
TOWELING DISPENSING APPARATUS
Filed May 18, 1936   3 Sheets-Sheet 2
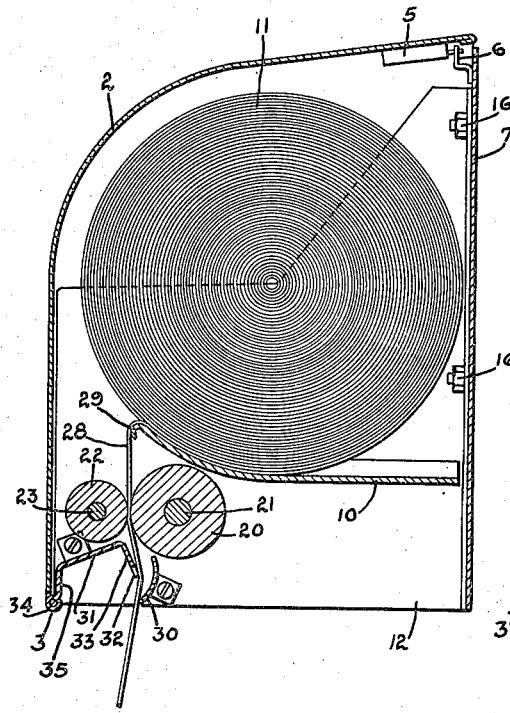
Fig.3
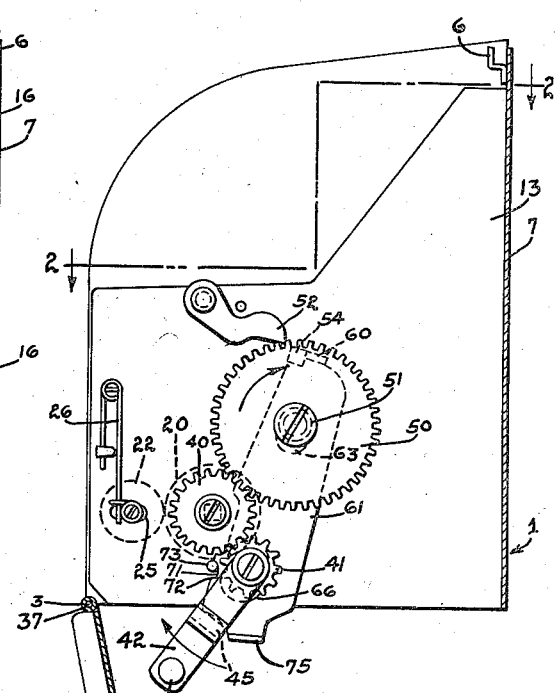
Fig.4
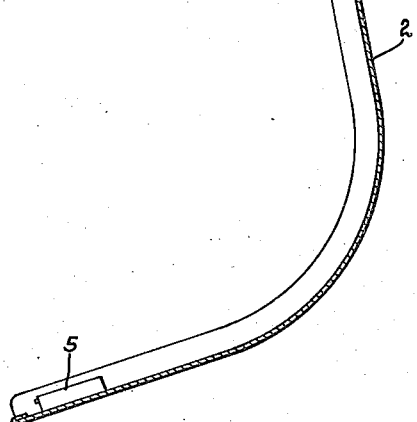
INVENTOR
RUDOLPH G. BIRR
BY *Paul Paul & Moore*
ATTORNEYS Patented Oct. 25, 1938

2,134,631

UNITED STATES PATENT OFFICE 2,134,631

TOWELING DISPENSING APPARATUS

Rudolph G. Birr, Lombard, Ill., assignor to Steiner Sales Company, Salt Lake City, Utah, a corporation of Utah Application May 18, 1936, Serial No. 80,267

7 Claims. (Cl. 164—84.5)

This invention relates to towel dispensing apparatus and has, among its objects, to provide an improved stop mechanism having a manually operable stop release element so arranged with reference to a dispensing control element, that proper dispensing by means of said control element cannot take place while the stop release element is being manually manipulated.

Another object is to provide a stop mechanism which is tamper-proof, that is which cannot be so manipulated that a continuous dispensing operation is obtainable.

Another object is to provide a crank-controlled feeding mechanism and a stop mechanism having a stop release element so associated with the crank that said element can be moved to stop releasing position by a finger of the same hand which operates the crank, and while the hand remains in position to thereafter operate the crank with but slight change of position of the hand.

Another object is to provide a part manually movable to release the stop, in combination with a crank adapted to be given a plurality of rotations to dispense the needed amount of toweling, and with said crank and said part so related that unless said part occupies a certain position, the crank cannot be given more than one consecutive rotation.

Another feature of the invention relates to the arrangement of a tear-off knife above but adjacent the bottom of the cabinet and the association therewith of a guard which, with the knife or its support, forms a downwardly leading throat delivering the paper from the bottom of the cabinet near the front edge thereof, and with the guard arranged to prevent withdrawal of the paper and to protect the hand against injury when it is thrust upwardly into the bottom of the cabinet.

Another feature relates to the use of the knife support as a hinging support for the cover, and another feature relates to the formation of the knife and hinging means from a single piece of material.

Another feature relates to the arrangement of the towel supply shelf, feeding means, knife and guard at the bottom of the cabinet giving a maximum of space for the towel supply so that the supply capacity of the machine is very much increased.

Another feature relates to the arrangement of knife support, guard, rolls and supply roll support as an anti-tampering closure or bottom for the cabinet.

Other features of the invention include all details of construction shown, along with the broader ideas of means inherent in the disclosure.

Objects, features and advantages of the invention will be set forth in the description of the drawings forming a part of this application, and in said drawings Figure 1 is a front view of the cabinet and mechanism with the cover in non-covering position;

Figure 3 is a vertical cross-section taken approximately on line 3—3 of Figure 2;

Figure 4 is a vertical cross-section taken approximately on line 4—4 of Figure 2, and showing the dipsensing and stop mechanisms;

Figure 1:
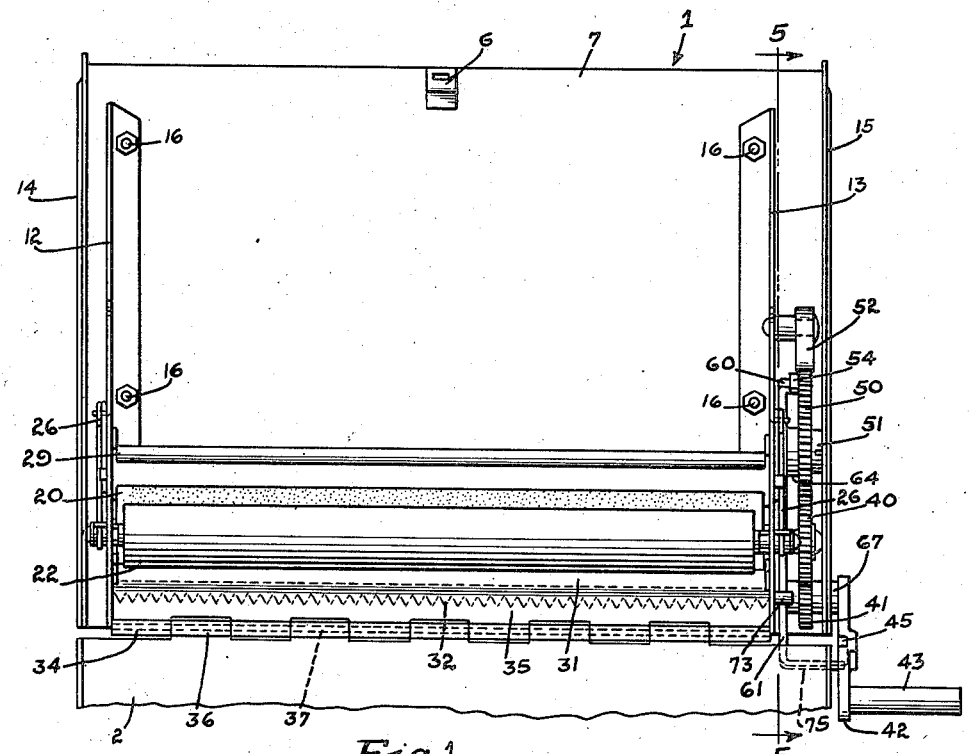

In the drawings, numeral 1 generally indicates the casing of a wall type of cabinet, open at the extreme bottom, and having a top and front cover or closure element 2 hinged at the lower front of the casing as at 3 to swing downwardly to the position of Figures 1 and 4. The cover has at its upper rear edge a lock 5, keeper 6 mounted on the back wall 7 of the casing.

Figure 2:
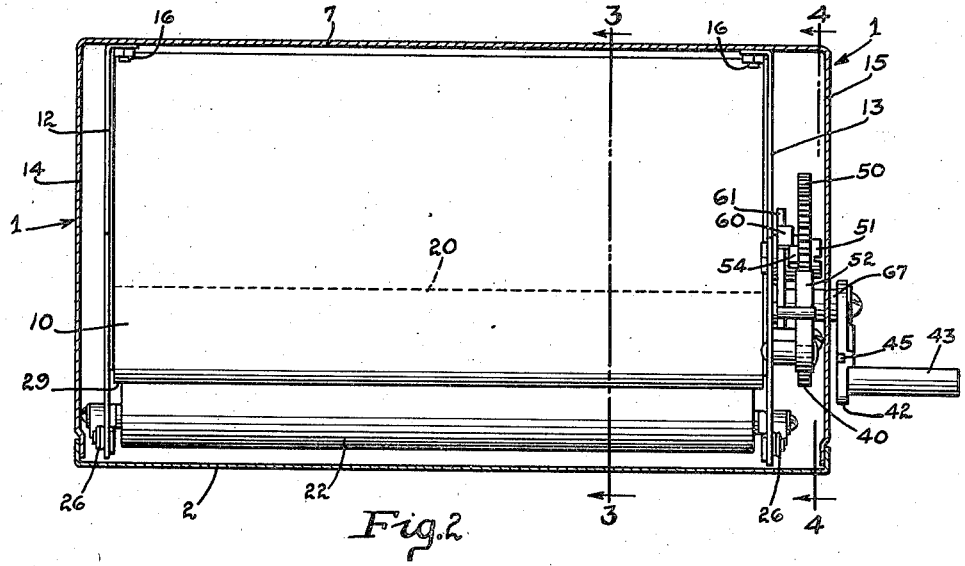
Figure 2 is a plan section substantially on line 2—2 of Figure 4, but with the cover closed.

Within the cabinet, spaced upwardly from its bottom and extending from the back 7 to a point spaced inwardly from the cover 2, is a support 10 for a roll 11 of toweling material, in this instance paper toweling. Flanking this shelf, one on each side, are vertical plates 12 and 13 spaced from the ends 14—15 of the casing as best shown in Figures 1 and 2. These plates are suitably connected to the back 7 by bolts 16 and the plates extend to the bottom of the casing.

Suitably supported by the plates 12 and 13 is towel feeding means comprising, in this instance, a measuring roll 20 having a shaft 21 or any suitable extensions, journaled in the plates. A second roll 22 acting as a pinch roll has a shaft 23, see Figure 4, the opposite ends of which are slidable in horizontal slots 25 of the plates 12 and 13. Springs 26 act against the shafts to press the roll 22 against the roll 20. Referring to Figure 3, the toweling 28 passes downwardly around a smooth forward edge 29 of the toweling supply support 10, thence between the rolls, thence downwardly between a guard 30 and channel element 31. The channel element has a tear-off knife consisting of teeth 32 formed on its inner flange 33. This channel also provides hinging elements 34 on the other or outer flange 35, which cooperate with similar elements 36 of the cover and with a pintle 37 to form a hinge for the cover 2.

The flange 33 and guard 30 form a kind of throat downwardly through which the toweling passes. The throat is offset rearwardly from a vertical line passing through the meeting points of the rolls 20 and 22. The toweling, in this instance, is paper, and when it has assumed the position of Figure 3, is adapted to be torn off by pulling forwardly against the teeth 32. The teeth or knife are so positioned and guarded as to avoid accidental injury to the fingers.

An important feature of this invention is the means for controlling dispensing and for limiting feed so that only a predetermined length of paper is delivered at each dispensing operation. This means includes, see Figures 1 and 4, a spur gear 40 on shaft 21 disposed on the outer side of plate 13. Mounted on a suitable bearing stud carried by the plate 13 is a pinion 41 meshing with the gear 40. Pinion 41 has a crank arm 42 having a handle 43. The arm on that side facing the gears, see Figure 1, is provided with a transverse groove 45, the purpose of which will be presently disclosed. Meshing also with the gear 40 is a larger gear 50 rotative on a suitable bearing stud 51, also carried by the plate 13. A suitable pawl 52 engages the gear to prevent reverse movement thereof, and therefore reverse movement of the said roll 20. The gear 50 has thereon a stop lug 54.

Figure 5:
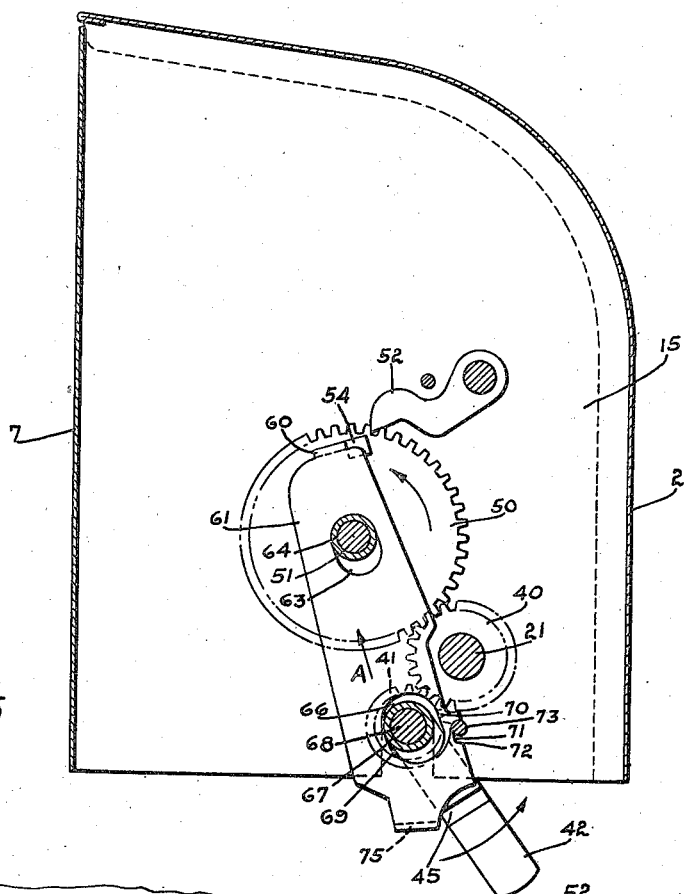
Figure 5 is a vertical cross-section taken approximately on line 5—5 of Figure 1 showing the stop mechanism in stop position, and with the cover closed.

The relative pitch diameters of the gears are such that a plurality of complete rotations of the crank are necessary to dispense the given or necessary amount of toweling. In this case, substantially three complete rotations of the crank from the position shown in Figures 4 and 5 are necessary to cause lug 54, to make one complete rotation from the stop position of those figures again to that stop position.

At the end of each feeding operation, the lug 54 engages with the stop 60 of a manually movable release plate 61. This plate is translatably mounted on the bearing studs for gears 41 and 50. The bearing stud 51 has a collar 64 thereon, see Figure 5, the sides of slot 63 of plate 61 slidably engage this collar. The plate has another slot 66 loosely surrounding a collar 67 on bearing stud 68 for gear 41. Referring to Figure 5: In stop position, or just after impact of 54 with 60, the side 69 of this slot is in contact with the sleeve while the side 70 is spaced from the sleeve. One edge of the plate is provided with a notch 71 merging into a camming surface 72. A projection 73 mounted on plate 13 is engaged by the cam when the plate 61 is pushed upwardly in the direction of the arrow A, see Figure 6, by the finger applied against a horizontal lateral extension 75. The extension 75 acts as means to prevent more than one rotation of the crank when the plate 61 is in the limit release position of Figure 6, and is arranged at the bottom of the plate in certain relation to the slot 45 of the crank handle. As positioned in Figure 5, the extension 75 coincides with the motion path of the slot, so that after release of the stop 60, 54, by pushing the plate 61 up and then releasing it, the crank can be given several rotations to complete the dispensing operation.

Figure 6:
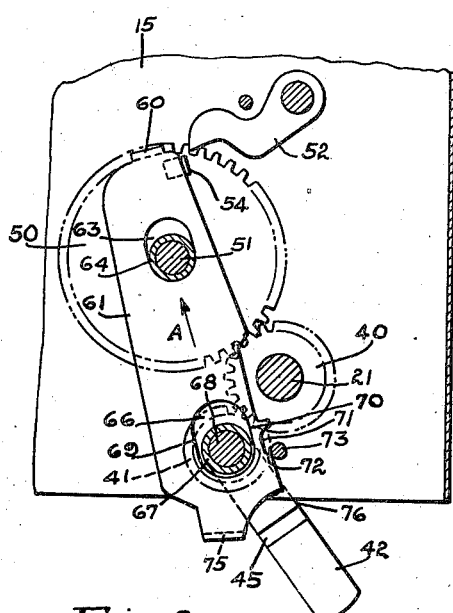
Figure 6 is a view similar to Figure 5, but showing the stop released, and in its limit release position, as when the finger is holding it in such position.
Figure 7:
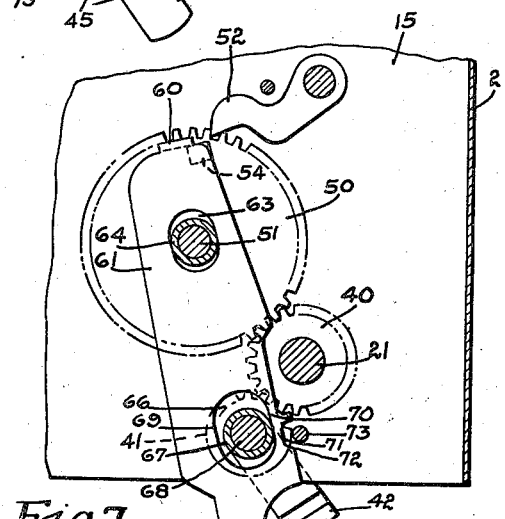
Figure 7 is a view similar to Figure 5 showing the stop release element as after release by the finger, and just before dispensing has begun.

Referring to Figure 6, which shows the plate as after being pushed to its upper limit by the finger, it will be noted that the cam 72 has engaged the pin 73 and caused the plate to rock to dispose the stop 60 over stop lug 54, the plate during this movement having swung about the sleeve 64 as a center. On removal of the finger, the plate falls to the position of Figure 7 with the stop extension 60 resting on the top of the lug 54. The side 70 of the slot is now against the collar, as shown in Figure 7.

With the latch positioned as in Figure 6, the element 75 is not in the line of the motion path of the slot, and therefore the edge 76 of the crank will, at or near the end of a single revolution, abuttingly engage the element 75 as a stop to prevent further rotation of the crank. In this way, it is impossible to operate the crank except for one revolution, while the latch element is held by the finger in the position of Figure 6. As the crank is turned from its position of Figure 7, the stop lug 54 rides from beneath the stop extension 60, and the latch immediately drops to the position of Figure 5.

The general operation is as follows: With the parts positioned as in Figures 4 and 5, the operator, with a part of his hand engaged with the crank, pushes the slide upwardly with his index finger to the limit position of Figure 6, after which he releases the plate to allow it to fall to the position of Figure 7. Then by slight change of position of the fingers, he grasps the crank handle and gives it three turns to feed the toweling to tear-off position. At the end of this operation, the lug 54 has again assumed the stop position of Figures 4 and 5.

If an attempt is made to continuously operate the feed crank while holding the latch in the position of Figure 6, the edge 76 of the crank will after the first rotation or part rotation engage the safety stop 75 of the latch plate, because, under these conditions, the stop 75 is not positioned in the motion path of the slot 45 of the crank.

Referring first to Figures 4 and 5 in which the stops are shown in stopping position, the operator now releases the stop as in Figure 6 by translating the element 61 to its position in that figure. As he does this the cam 72, engages the stationary pin 73 and swings or tilts the lower part of the element 61 in clockwise direction about the element 64 as a center, thus bringing the stop 60 to a point over the stop 54. On release of 61, the same assumes the position shown in Figure 7. The operator now turns the crank 42 in counterclockwise direction, that is in a direction away from 75, and, after a relatively short distance of travel of 42 in that direction, 54 also moving in counterclockwise direction, passes from beneath 60 and 61 immediately drops to the position of Figure 5 to again be in path of the element 54. The stop 54 will then eventually engage the right hand side of 60, as in Figure 5.

I claim as my invention:

1. A towel dispensing apparatus having a stop mechanism including, a part manually movable to release the stop, a crank-operated dispensing mechanism in which a plurality of rotations of the crank are necessary to dispense a given amount of toweling following movement of said part to release position, and means respectively associated with said part and said crank when said part is at its limit of release position and cooperative to prevent more than one rotation of the crank while the stop is in release position.

2. A towel dispensing apparatus having a stop mechanism including, a slide movable by the finger to release the stop, a crank-operated dispensing mechanism in which a plurality of rotations of the crank are necessary to dispense the needed amount of toweling, said crank and part having parts so related that the crank cannot be given more than one consecutive rotation while the slide is at its stop-release position.

3. A towel dispensing apparatus having means for feeding toweling including a crank operated spur gear train, one of the gears having a stop lug, and said gear making one complete rotation only after repeated rotations of the crank, a latch slidably mounted and having a stop engaged by the stop lug to prevent operation of the feeding means, means for causing the stop to rest on the lug after the latch has been moved to stop release position, and means respectively associated with the crank and said latch and cooperative to prevent more than one rotation of the crank while the stop is at the limit of its release position.

4. A towel dispensing apparatus having, a feeding roll having a gear, a crank operating a gear which meshes with the feeding roll gear, a third gear meshing with the feeding roll gear and having a stop lug movable therewith, a latch plate translatably mounted and having a stop with which said stop lug is engageable to prevent operation of the feeding roll, and means so controlling the plate when said plate is translated following engagement of the stops, as to cause the stop of the plate to assume and be maintained in non-stop relation to the lug to permit the lug to move when the crank is operated.

5. A towel dispensing apparatus having a crank-operated towel dispensing mechanism, a stop mechanism for said dispensing mechanism including a slide which normally is in stop position but which must be moved by the user to release the stop mechanism, said slide having a lug and said crank having a groove which is registrable with the lug to permit complete rotation of the crank only when said slide is at an intermediate non-stop position.

6. A towel dispensing apparatus having a crank-operated towel dispensing mechanism in which the crank must be given a plurality of complete rotations to dispense the proper amount of toweling, a stop mechanism for said dispensing mechanism including a part which must be moved by the user to release stop mechanism, and means respectively on said part and crank so arranged that the crank cannot be given more than one complete revolution while said part is held at limit stop release position by the user.

7. A towel dispensing cabinet having a feed roll having a first gear, a second gear meshing with the first gear and having a stop thereon, means rotatably mounting the second gear, a third gear meshing with the first gear, and means rotatably mounting said third gear, and a stop plate translatably mounted on the mounting means for said second and third gears, and movable into and out of the path of said stop of the second gear.

RUDOLPH G. BIRR.